United States Patent
Poradish et al.

(10) Patent No.: US 6,249,387 B1
(45) Date of Patent: Jun. 19, 2001

(54) STABLE ENHANCED CONTRAST OPTICAL SYSTEM FOR HIGH RESOLUTION DISPLAYS

(75) Inventors: Frank J. Poradish, Plano; Duane S. Dewald, Dallas; Steven M. Penn, Plano, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/306,491

(22) Filed: May 6, 1999

Related U.S. Application Data

(60) Provisional application No. 60/085,357, filed on May 13, 1998.

(51) Int. Cl.[7] ............................. G02B 27/14; G02B 27/12
(52) U.S. Cl. ........................... 359/634; 359/638; 359/640
(58) Field of Search ................................ 359/634, 638, 359/640, 831, 833, 836; 353/33, 81; 356/19, 136, 137

(56) References Cited

U.S. PATENT DOCUMENTS

| | | | | |
|---|---|---|---|---|
| 5,602,679 | * | 2/1997 | Dolgoff et al. ..................... | 359/640 |
| 5,612,753 | * | 3/1997 | Poradish et al. ..................... | 348/743 |
| 5,704,701 | * | 1/1998 | Kavanagh et al. ..................... | 353/33 |
| 5,808,800 | * | 9/1998 | Handschy et al. ..................... | 359/630 |
| 5,905,545 | * | 5/1999 | Poradish et al. ..................... | 348/743 |
| 5,914,818 | * | 1/1999 | Tejada et al. ..................... | 359/663 |
| 6,034,821 | * | 3/2000 | Schenfeld ..................... | 359/618 |
| 6,052,231 | * | 4/2000 | Rosentbluth ..................... | 359/636 |
| 6,078,429 | * | 6/2000 | Lyon ..................... | 359/634 |
| 6,084,703 | * | 7/2000 | Dewald ..................... | 359/290 |
| 6,144,498 | * | 11/2000 | Bryars et al. ..................... | 359/634 |

* cited by examiner

*Primary Examiner*—Georgia Epps
*Assistant Examiner*—Saeed Seyrafi
(74) *Attorney, Agent, or Firm*—Charles A. Brill; Wade James Brady, III; Frederick J. Telecky, Jr.

(57) ABSTRACT

An optical system for illumination spatial light modulators. The optical system includes a tall color splitting prism (16) with substantially symmetrical face bonding areas, thereby eliminating the need for external holding plates. The face bonding areas (62) are outside the optically active area. The tall prism (16) allows for better control of stray light, including a heat sink (41) for absorbing stray or OFF state light, preventing overheating of the optical assembly. The tall prism (16) also allows adjustments to be made to any other optical components such as projection lenses and TIR prisms (14).

7 Claims, 8 Drawing Sheets

STABLE ENHANCED CONTRAST OPTICAL SYSTEM FOR HIGH RESOLUTION DISPLAYS

This application claims priority under 35 USC §119(e)(1) of provisional application No. 60/085,357 filed May 13, 1998.

BACKGROUND OF THE INVENTION

1. Field of the Invention

This invention relates to optical systems, more particularly for optical systems for high resolution display systems.

2. Background of the Invention

Spatial light modulator-based display systems have become more prevalent in recent years. Spatial light modulators in these systems typically comprise an array of individually addressable elements laid out in an x-y grid. They elements form the image by turning ON and OFF selectively based upon control signals. The elements control the perceived intensity of the image pixels by controlling the amount of light that reaches the final display surface.

These systems generate color images in several different ways. Sequential color systems typically use one modulator and sequence the color of light that illuminates the modulator. A separate image for red, green and blue, for example, is generated and the integration of the human eye blends those colors and their respective intensities for each pixel into a final image. Another approach is to provide three differently colored sources of light or three different modulators or modulator panels, each with color filters that produce the colored images for each color.

The three modulator systems have several different implementations. In some systems, a prism is used that splits a white light source into red, green and blue. The light travels out of the prism to the respective modulators, where it is modulated to create the image and then transmitted back into the prism for recombination and projection to the final display surface.

Several problems exist with these prisms. Surface reflections, absorption and scattering characteristics affect image quality. The latter two reduce the efficiency and quality of light. Additionally, light absorbed at some optical surfaces can induce thermal gradients in the optical glass, distorting the assembly. This can result in misconvergence. Further, for telecentric systems, the prism size must increase with the increase of the resolution and size of the device.

Therefore, a solution is needed for multiple spatial light modulator systems that provides color splitting without increasing the size of the optics, as well as reducing the absorption and scattering characteristics.

SUMMARY OF THE INVENTION

An optical system for illumination of spatial light modulators is disclosed. The system includes a tall color splitting prism. The tall prism has symmetrical face bonding areas that provide enough stability to the prism components that external plates are not required. Additionally, a heat sink is used for OFF state or stray light for better thermal management of the optical system. The system provides enhanced control of all incoming and outgoing light in the system, increasing contrast ratio and improving image quality.

It is an advantage of the system in that it does not require external plates to hold prism components together for the color splitting prism.

It is an advantage of the system in that heat in the system is controlled, thereby allowing higher power light sources and preventing thermal expansion of optical components.

It is an advantage of the system in that it controls stray light in the system, thereby preventing stray light and scattering artifacts in the projection path.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1A:
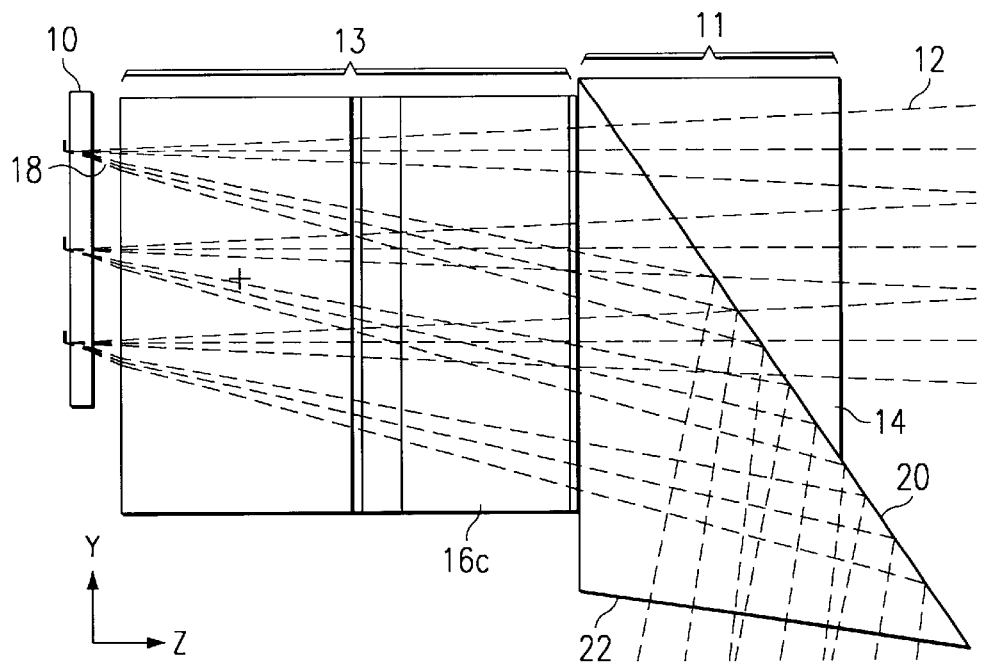
FIGS. 1a–c show side views of a prior art prism optical system with a reflective spatial light modulator.
Figure 1B:
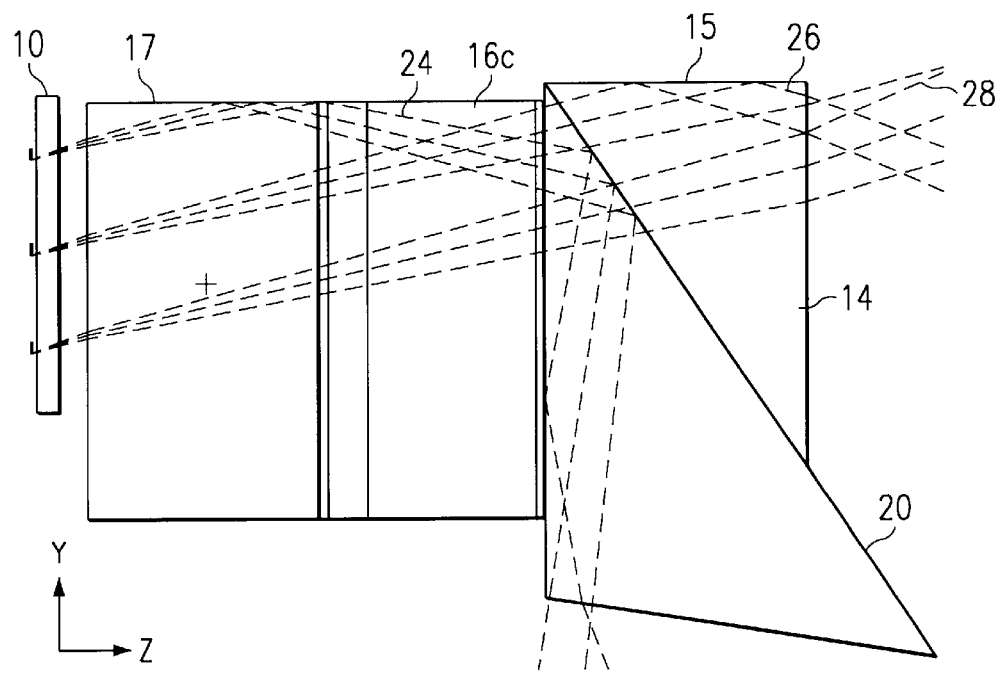
Figure 1C:
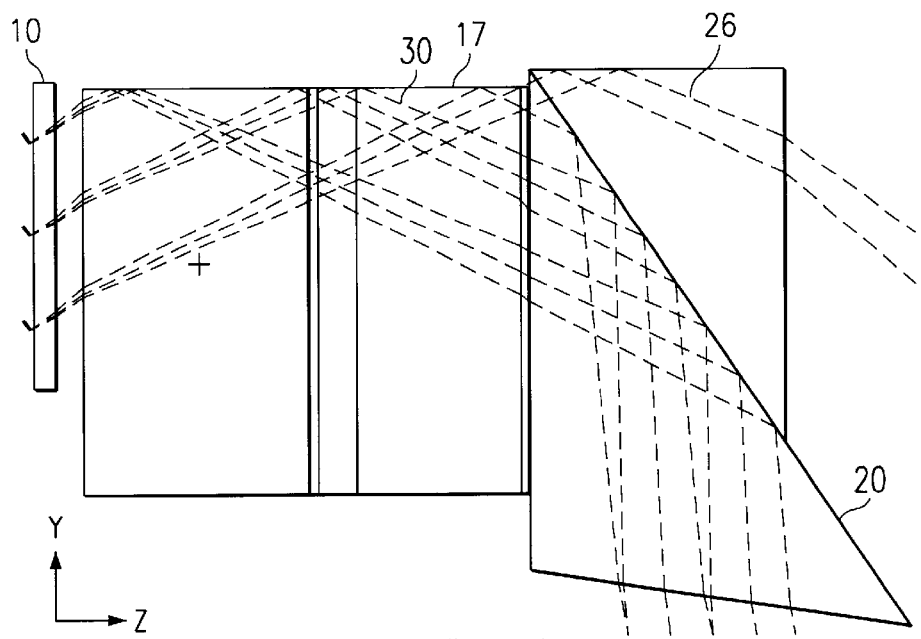

FIGS. 1a–1c show a prior art prism optical system for a reflective spatial light modulator image system. The embodiment shown is typically used with three modulators, one each for red, green and blue. However, for discussion purposes, only one modulator 10 is shown. Light from the illumination path enters the first prism 14, of a a total internal reflection (TIR) prism assembly 11.

An example path 12 shows the light entering the TIR prism 14, passing to through the color prism assembly 13. Since the other modulators for the other two colors are not shown, it appears that the light just passes directly through the color prism assembly 13. However, the color prism assembly 13 actually splits the light into red, green and blue components. The modulator 10 shown in this embodiment is the green modulator, so the rays of light actually striking the modulator 10 are green.

If the elements of the modulator are ON, or deflected, the light will travel along path 18 back through the color prism assembly 13 to the TIR prism 14. Since the path 18 is at a different angle, it strikes the TIR surface 20, which causes the light to reflect towards the face of the prism in the projection path 22. The light reflected along path 18 to face 22 will be projected onto the final imaging surface, such as a display screen. It is well known in the art that the illumination 12 and projection 22 paths may be reversed such that the illumination light is reflected by the TIR surface 20 while the projection light passes through the TIR surface 20.

It must be noted that some reflective modulators use light from the OFF state to image the final picture for display, some use the ON state. While the example used here is to image with the ON state light, no limitations of the invention should be implied.

Additionally, some modulators have two states, ON and OFF, or ON and unaddressed. Others have three states, ON, OFF and unaddressed. To ensure a full discussion of all possibilities, the modulator in these examples are assumed to have all three states. Each state is shown separately, but in most systems, the modulator will have elements in each state at any given time. For the OFF and flat state drawings hereafter, the light will not be shown entering the TIR prism from the illumination system, but will be assumed.

FIG. 1b shows a similar arrangement as FIG. 1a, but shows the light for the unaddressed state, which for some modulators is the flat state. Light striking elements in this state on the modulator 10 will reflect the light in one of three directions in the prior art embodiment shown in FIG. 1b.

A first example is shown by path 26. Light is reflected back through the color prism and strikes the upper surface 15 of the TIR prism 14. This light is reflected into the illumination path, which may cause scattering. A second example, shown by path 28, is the desired case. Light is reflected out of the TIR prism away from both the illumination path and the projection path.

A third example is shown by path 24. Light is reflected off the top surface 17 of the color prism assembly 13, strikes the TIR surface 20 of the TIR prism 14 and is reflected, or transmitted, into the projection path. This is undesirable. In most systems, only the ON state light used for imaging is desired in the projection path.

The light from the flat state that enters the projection path causes contrast ratio degradation. As mentioned above, only ON state light is desired for imaging in this example. Having light enter the projection optics when not desired would occur when the image (or portion thereof) is supposed to be black. This makes the black levels lighter than desired. The contrast ratio is the ratio between the blacks and whites; a higher contrast ratio is desirable. By raising the black levels, the difference between the blacks and whites is lessened and raising the black levels lowers the contrast ratio.

The same problem occurs in the prior art embodiment when the modulator is in the OFF state. Light again travels along path 26 into the illumination path which is undesirable. Also, light travels along path 30, reflecting off the top surface 17 of the color prism assembly 13 to the TIR surface 20 and into the projection path. This is very undesirable as discussed above.

The prior art embodiments shown in FIGS. 1a–c have significant other problems as well. Because of the size of the prisms, sufficient face area does not exist to bond the faces of the prisms directly together. Glass and/or metal plates hold the prisms together. These plates and adhesives have different thermal expansion rates and different dimensional tolerances that induce harmful stress and distortions.

Yet another problem with the prism shown in FIGS. 1a–1c results from its size. In telecentric optical systems, as the resolution increases the size of the modulator typically increases as well. In order to move from a lower resolution to a higher resolution, the prism size and volume increases. For example, a move from SVGA to SXGA could result in an increase of prism volume by as much as 4×. This also requires large, expensive elements in the projection path.

Figure 2:
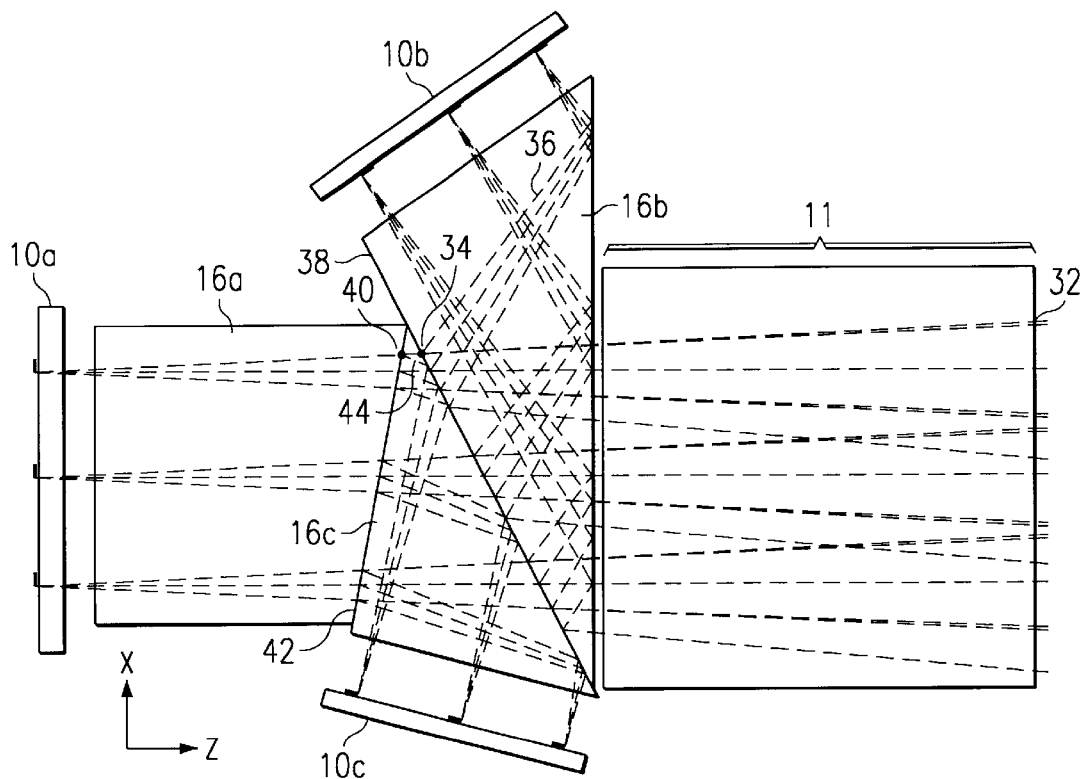
FIG. 2 shows a top view of one embodiment of a prism optical system in accordance with the invention.

A system shown for three modulators in accordance with the invention that solves these problems is shown in FIG. 2. The one modulator 10 discussed previously will now be referred to as 10a. Modulators 10b and 10c are the modulators for red and blue respectively. The color prism assembly 13 appears far different than in previous drawings because FIG. 2 shows a top view revealing prisms 16, 17, and 19, whereas all previous figures were of side views.

The modulators 10a–c have the elements set out in the ON position. From this perspective one can see the functioning of the overall system. Light enters TIR prism assembly 11, which again looks different from the top view than the side, and is split by the color prism assembly 13 into the appropriate color components for each modulator 10a–c. The paths shown are only for the incoming light to the modulators.

An example of one such path is shown by incoming path 32. The light enters the TIR prism assembly 11 and strikes the red/blue face 38 of the color prism at point 34. The red light is reflected along path 36 to the red modulator 10b. The blue/green light passes to the blue/green face 42 and strikes at point 40. The blue light is reflected along path 44 to eventually reach blue modulator 10c. The remaining green light eventually passes to the green modulator 10a. It should be noted at this point that the use of three modulators is not a restriction on this system.

In a two-modulator system, such as that shown in U.S. Pat. No. 5,612,753, a color wheel is used to sequence the light such that one modulator receives only one color of light while the other modulator receives two colors in sequence. In such a case, the modulator receiving two colors would only be able to process each color for half of the time that the other modulator processes its one color. However, this can be used to balance the spectrum of the incoming white light.

In this embodiment of the invention, the color prism is considerably taller than in systems previous to this invention and some supplemental techniques can be combined with the taller prism for optimal system design. These combinations have several key effects on the overall system design. All light rays are able to pass through a minimum number of prism faces without the possibility of re-entering the illumination or projection elements. The taller prisms have more face area that allow for sufficient bonding without the use of external plates and adhesives. The marginal rays at the corners of the modulator are controlled such that a much smaller prism can be used; and an increase in resolution will not necessarily result in an increase in prism size, although it can.

Figure 3A:
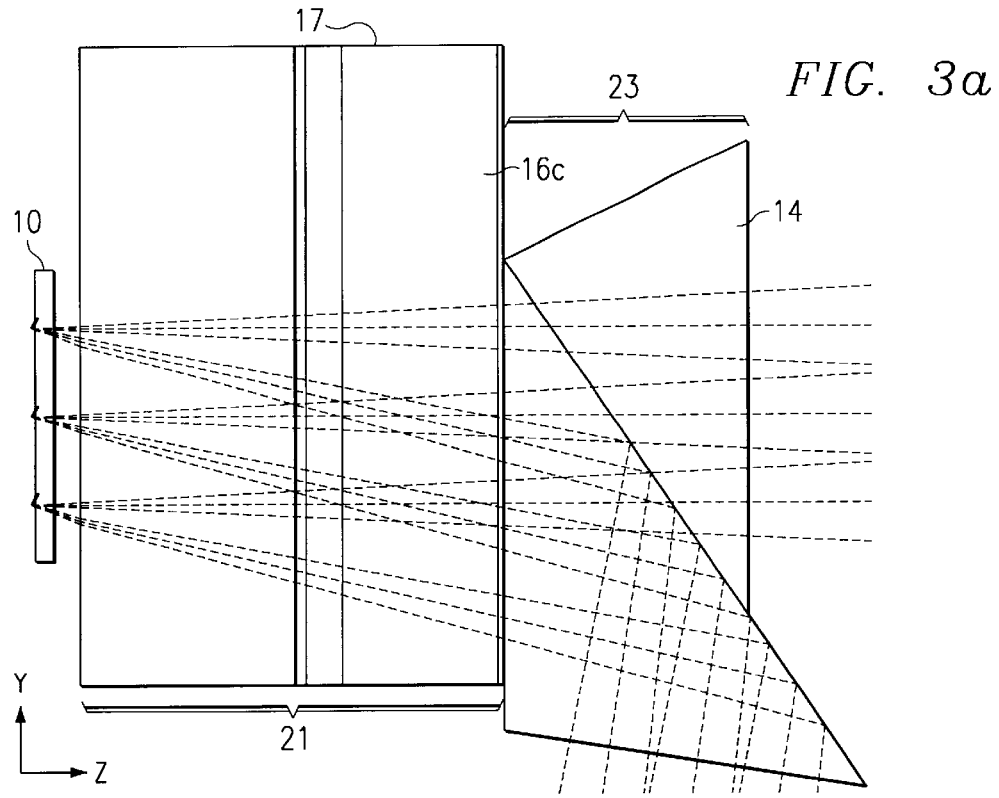
FIGS. 3a–3c show side views of a prism optical system in accordance with the invention.
Figure 3C:
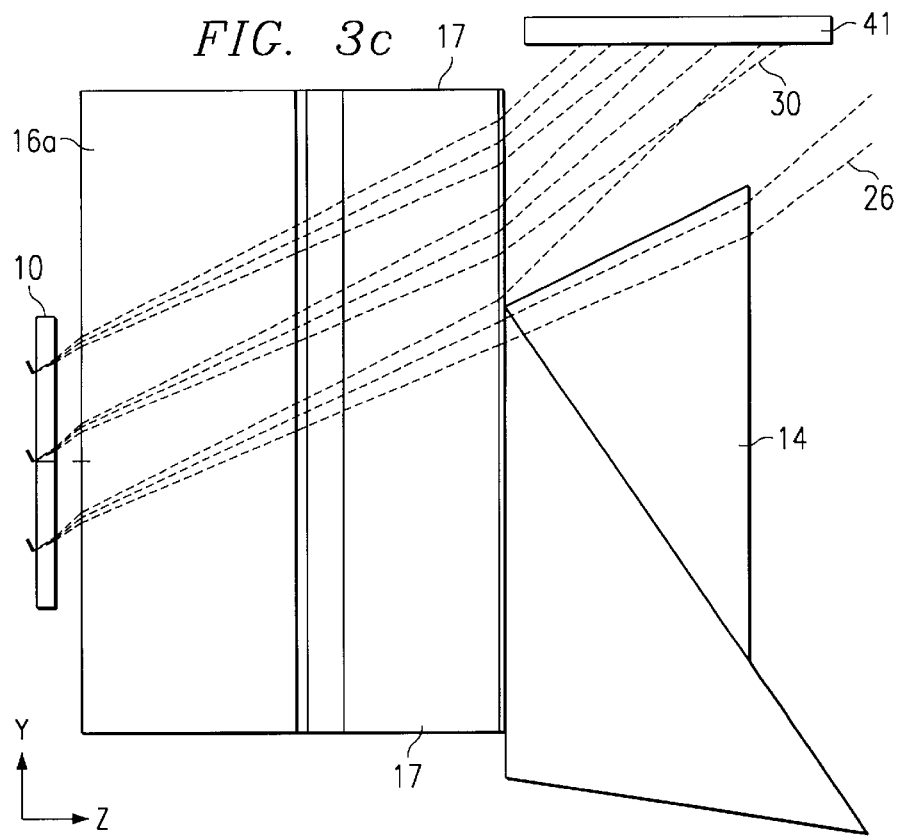
Figure 3B:
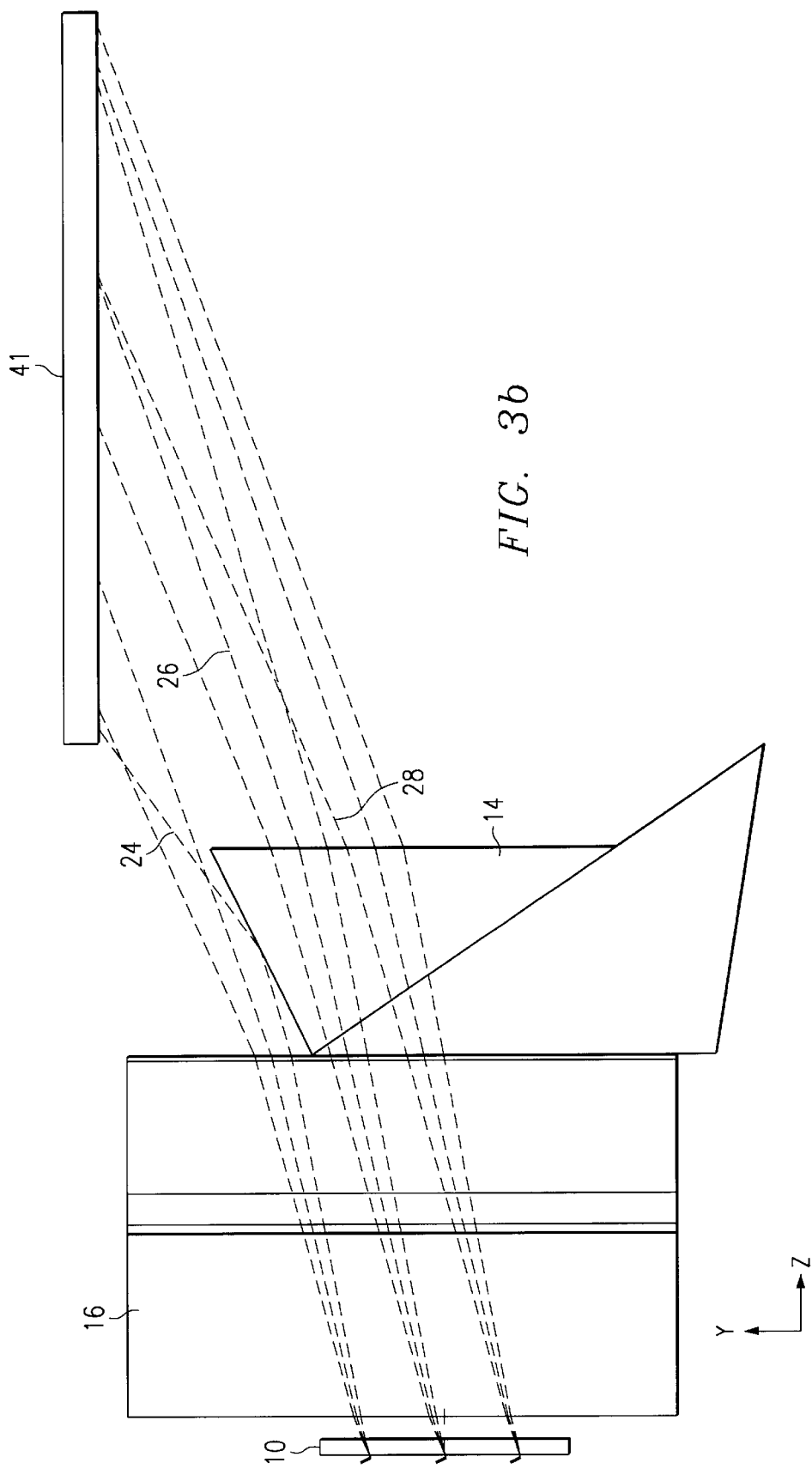

For a more detailed discussion, the system of FIG. 2 will be addressed in terms of one modulator out of the three shown. As noted above, it is possible to have only two modulators. FIGS. 3a–c show side views of the modulator system shown in top view of FIG. 2. For consistency, the green modulator remains in the drawing.

FIG. 3a shows the taller color splitting prism assembly 21 with the green modulator 10 in the ON state. Comparing FIG. 3a with FIG. 1a, it can be seen that the color prism assembly 21 is considerably taller than that of FIG. 1a. A further beneficial effect of this change in dimension is the positioning of the modulator 10 with regard to the prism assembly 21. In FIG. 1a the modulator has to be positioned off center of the prism. However, because of more optimal angles available in the taller prism, the modulator can be positioned more centrally to the taller prism.

FIG. 3b shows the taller prism in the flat or unaddressed state light. Again, comparing FIG. 3b to FIG. 1b, the dramatic difference can be seen. Ray 24 in FIG. 1b entered the projection optics, an undesirable effect. Ray 24 in FIG. 3b strikes the top surface of the TIR prism and is reflected away if a coated surface is used, or absorbed, depending upon the coating. Ray 26 in FIG. 1b entered the illumination optics, but now exits the TIR prism at an angle such that such effect is avoided, similar to ray 28 in both diagrams. A further technique used with regard to the TIR prism is discussed with reference to FIGS. 5a–5c.

A heat sink could be used at the top of the diagram, shown by 41 in FIG. 3b. This heat sink would receive the rays that are passing through the TIR prism, such as rays 26 and 28. FIG. 3c shows the modulator in its OFF state.

FIG. 3c shows that the rays 30 and 26 no longer travel into the projection path or the illumination path as shown in FIG.

1c. All of the light impinging upon the OFF elements of modulator 10 pass through the color splitting prism assembly 21 or the color splitting prism assembly 21 and the TIR prism assembly 23 away from the illumination and projection optics. Again, a heat sink 41 could be used here to absorb the heat from the OFF state or flat state light.

The overall effect of the taller prism results in better control of the light. This prevents light from the OFF and unadressed states from interfering with the image quality and contrast ratio of the overall system. The taller prism can be combined with other techniques that result in even more improvement. The angles of the color splitting dichroics can be better optimized. This results in a minimized back working distance, making design of the projection lens easier. Other angles could be adjusted as well. For example, the angles of the TIR prism could be changed. Additionally, the size of the prism necessary for a predetermined modulator size can be reduced.

Figure 4A:
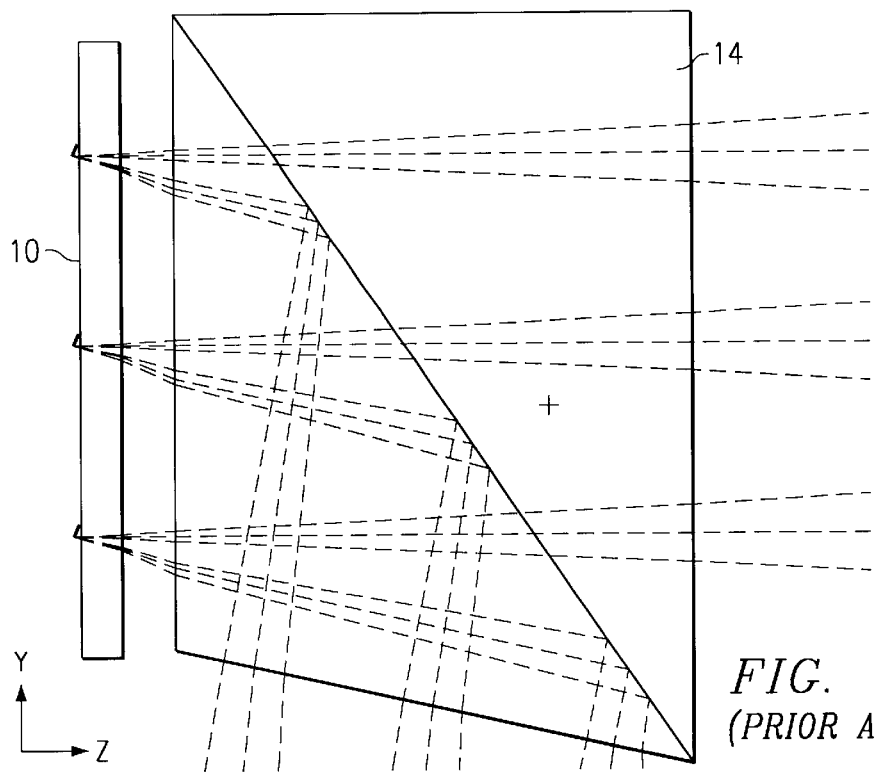
FIGS. 4a–4c show side views of prior art total-internal reflection (TIR) prism.
Figure 4B:
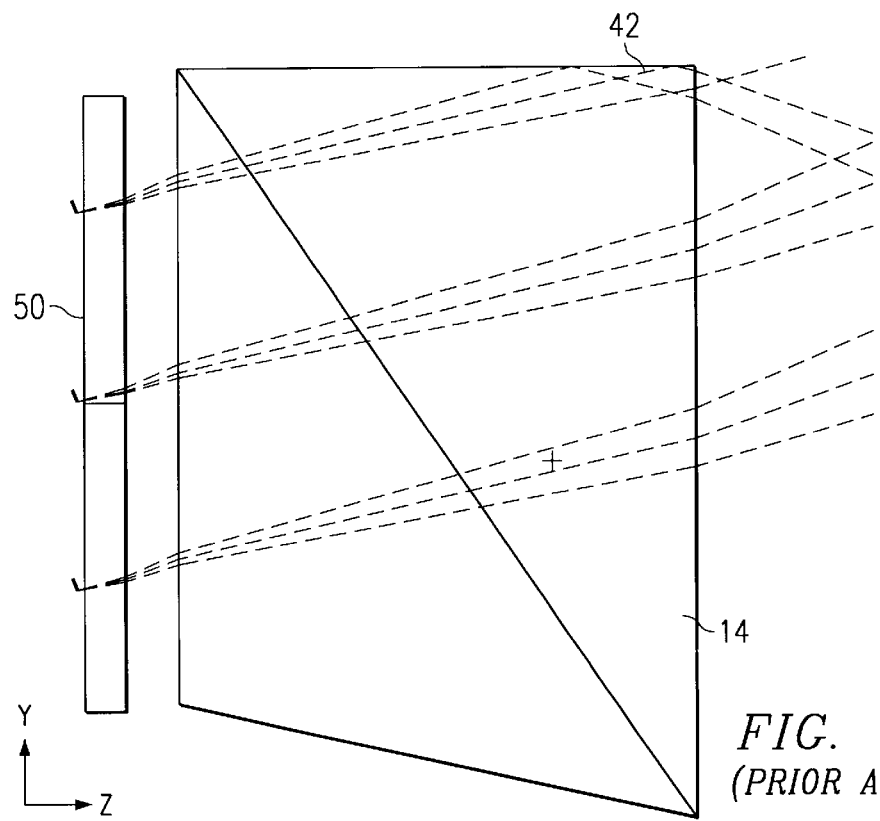
Figure 4C:
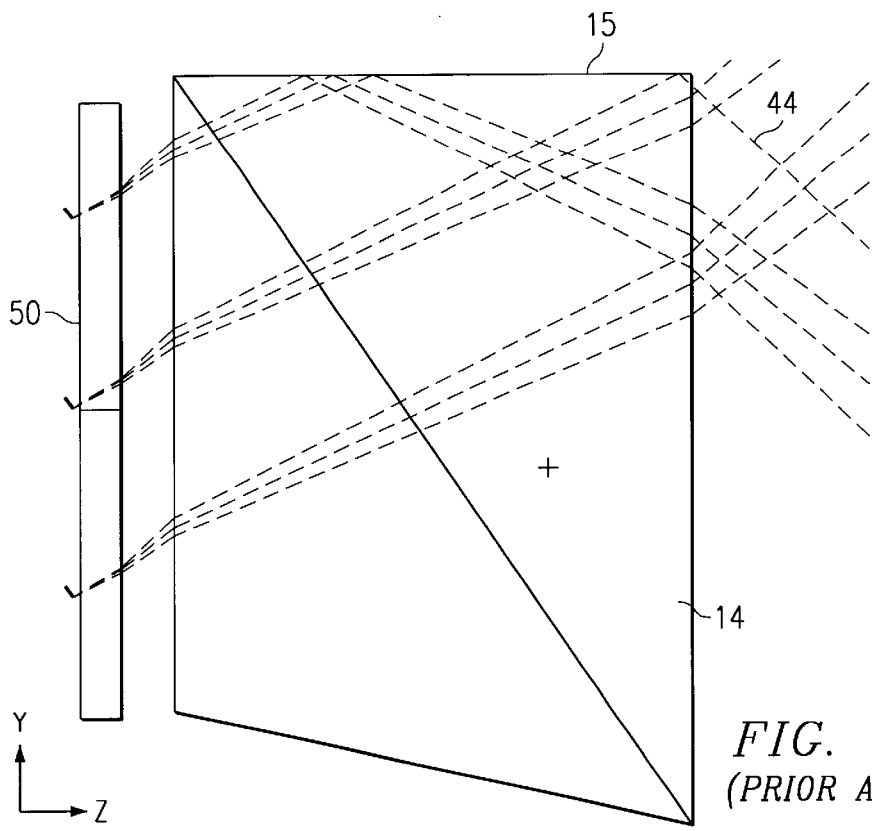

FIGS. 4a–4c show a prior art embodiment of the TIR prism for each of the three states of the modulator. The modulator here is a single modulator, not one of a multiple modulator system as discussed previously. Therefore, there is no need to show the color prism. In some systems using only one modulator, a color wheel is used to sequence the light for the single modulator. The TIR prism controls the light impinging upon and being imaged by the modulator.

As can be seen in FIGS. 4a–4c the top surface 15 of the TIR prism is relatively flat. Ray 42 strikes this flat top surface 15 in the unaddressed state of FIG. 4b. This causes an undesirable reflection into the illumination optics. This is shown for the OFF state by ray 44 (shown in FIG. 4c).

Figure 5A:
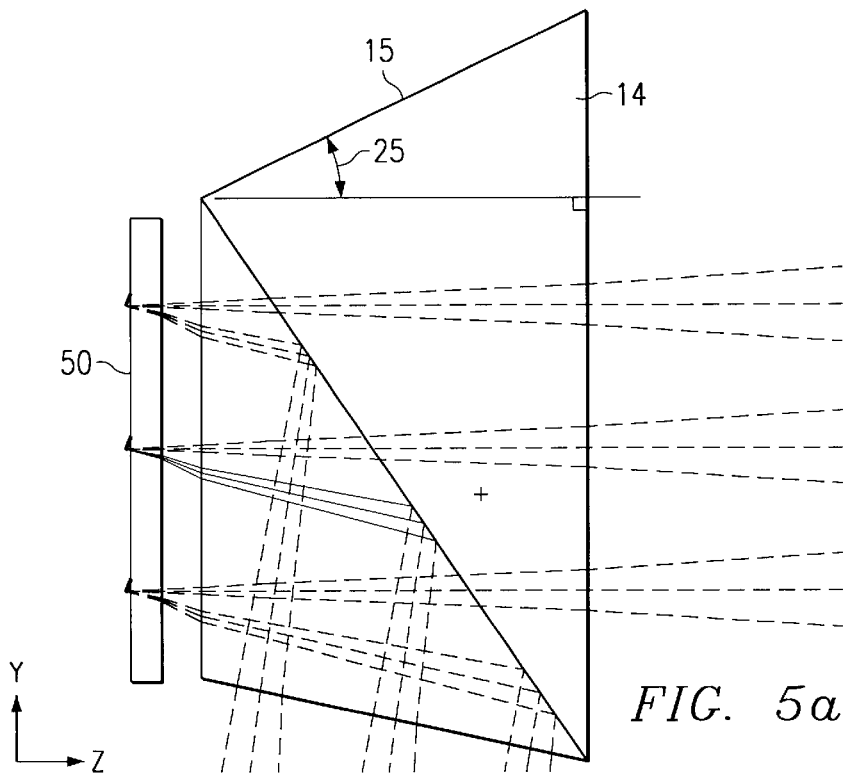
FIGS. 5a–5c show side views of a TIR prism in accordance with the invention.
Figure 5B:
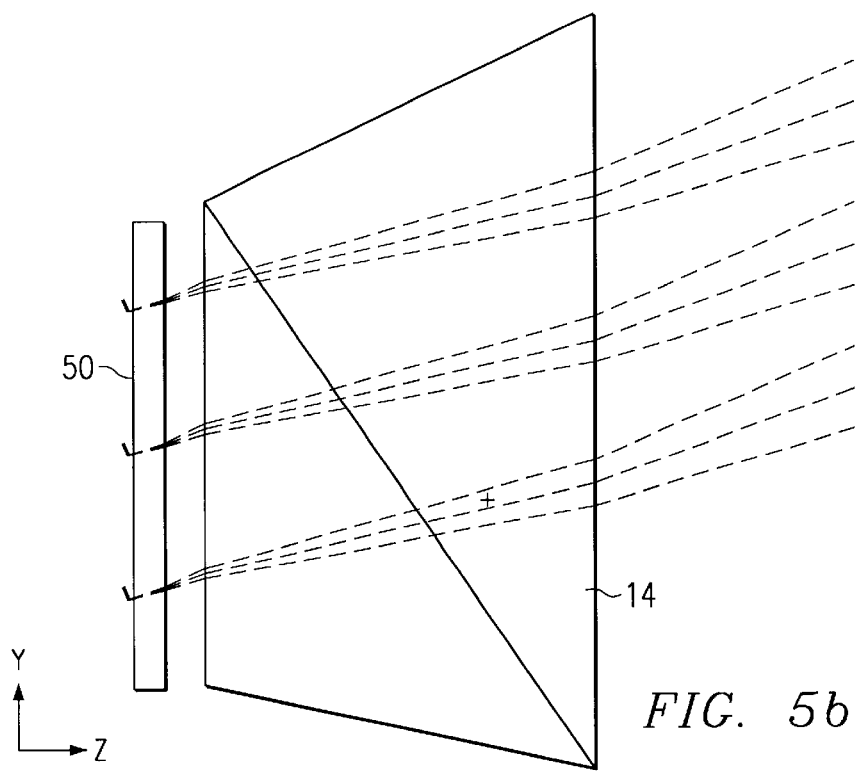
Figure 5C:
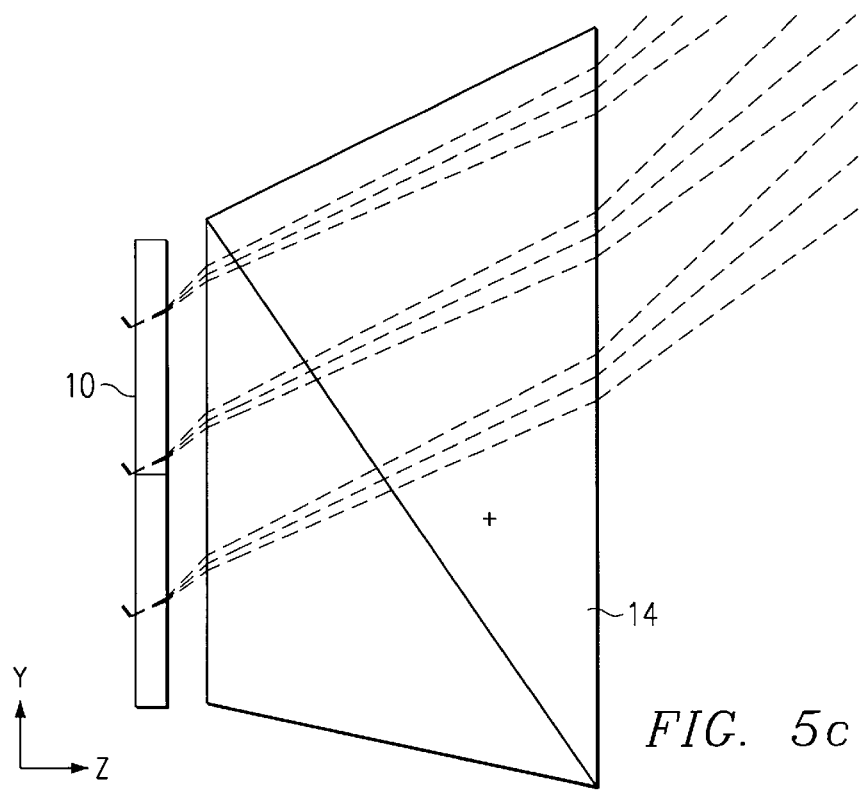

FIGS. 5a–5c show a TIR prism assembly used in combination with the present invention. The top angle 25 of the prism has been changed from relatively flat to an angle of 20–30 degrees. Experiments have shown that a top angle of approximately 27.5 degrees provides optimal performance. As can be seen from all the states of the modulator elements shown in FIGS. 5a–5c, this eliminates reflection from rays that otherwise would have reflected off the top surface 15 of the TIR prism assembly if it had been flat.

A further technique that provides even better system performance is the use of vignetting in the illumination path. Apertures are used in the illumination paths that eliminate any marginal rays that would strike the corners of the modulator. Such apertures are set forth in U.S. patent application Ser. No. 60/071,243, commonly owned by the assignee and incorporated by reference herein.

One concern in increasing the height of the prism is a corresponding increase in the volume. However, a combination of angles exists that minimize the volume of the prism based upon the modulator panel size. As will be seen with regard to FIGS. 6 and 7, any increase in cost will more than likely be offset by the savings made by eliminating the plates.

Figure 6:
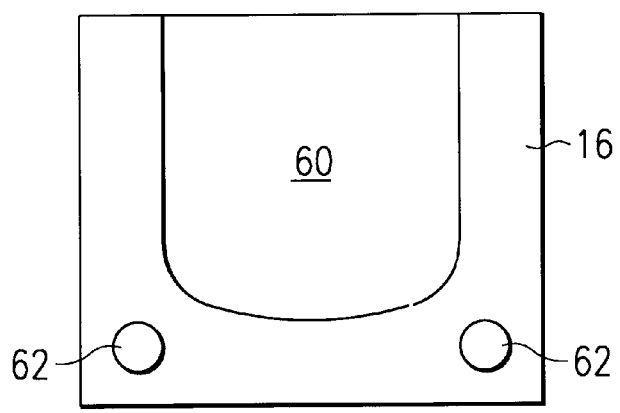
FIG. 6 shows a prior art embodiment of face bonding areas.

FIG. 6 shows the area of the red/blue face of a typical color prism 16 used prior to this invention. The region 60 is the area of the face through which light will pass during system operation. The two areas 62 are the available spaces for bonding adhesive. As can be seen by this, very little space is available, which gives rise to the need for the external holding plates.

Figure 7:
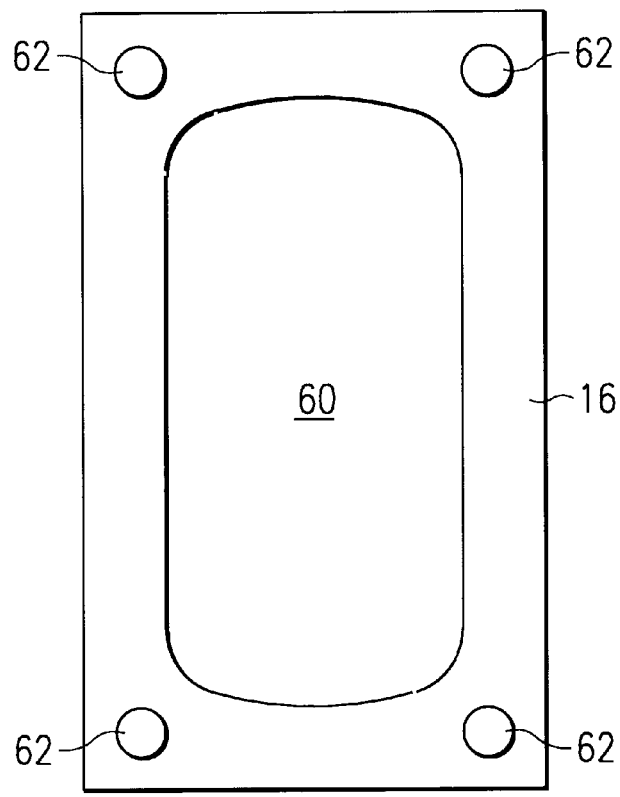
FIG. 7 shows one embodiment of face bonding areas.

FIG. 7 demonstrates how the taller color prism 16 eliminates the need for the plates. The area through which light will pass is shown by area 60, the optically active area. As mentioned above, the modulator can be centered on the prism with the relaxation of the tolerances caused by the taller prism. Additionally, more area is available for the bonding areas 62. In this case, the plates would not be necessary, reducing the cost and complexity of the system, while avoiding the thermal problems discussed above. The substantially symmetrical bonding areas 62 provide the necessary area for bonding.

In summary, the use of a taller color splitting prism solves several problems including those related to light scattering, contrast ratio and heat absorption. The taller prism can be used in combination with other techniques such as angling the top of a TIR prism and vignetting in the illumination path. However, the taller prism can also be used without those techniques and will still improve system performance.

The discussion to this point has been focused on reflective light modulators. However, the taller prism with the symmetrical bonding areas, as well as the heat sink, could be used in transmissive modulators as well. Both reflective and transmissive modulators transmit light to an imaging surface, either by direct transmission or by reflection. The taller prism and the heat sink would be useful in either case. The only aspect that is different is that the heat sink in a reflective modulator system absorbs OFF state light, but in a transmissive modulator system it would absorb stray light. None of the discussion above is intended to limit the application of these concepts to reflective modulators.

Thus, although there has been described to this point a particular embodiment for a color splitting prism in an imaging system, it is not intended that such specific references be considered as limitations upon the scope of this invention except in-so-far as set forth in the following claims.

What is claimed is:

1. An optical system for illuminating a spatial light modulator with thermal management, comprising:

a color-splitting prism operable to receive light and divide said light between at least two spatial light modulators, said spatial light modulators having at least two states, a first states for transmitting light to an imaging surface, and a second state for transmitting light away from said surface; and an isolated heat sink for receiving light transmitted from said spatial light modulators away from said surface.

2. An optical system for illuminating spatial light modulators, comprising:

an illumination path;

a color-splitting prism in said illumination path operable to receive light and to split light between at least two spatial light modulators;

vignetting apertures in said illumination path for framing light in said illumination path to prevent stray light from entering said color splitting prism; and a heat sink positioned adjacent said color-splitting prism to absorb stray light from said prism and to prevent stray light from entering a projection path.

3. An optical system comprising:

a reflective spatial light modulator;

an illumination light path leading to said spatial light modulator;

a projection light path leading away from said spatial light modulator;

a TIR prism assembly on said illumination and projection light paths, said TIR prism having a top surface angle of 20° to 30°.

4. The optical system of claim 3, said TIR prism having a top surface angle of 27.5°.

5. An optical system comprising:

a reflective spatial light modulator;

an illumination light path leading to said spatial light modulator;

a projection light path leading away from said spatial light modulator;

a TIR prism assembly on said illumination and projection light paths, said TIR prism assembly having a top surface;

a color splitting prism on said illumination and projection light paths between said TIR prism assembly and said reflective spatial light modulator, said color splitting prism having a top surface above said top surface of said TIR prism assembly to prevent said top surface of said color splitting prism from reflecting light from said spatial light modulator into said TIR prism assembly.

6. The optical system of claim 5, said TIR prism assembly having a top surface angle of 20° to 30°.

7. The optical system of claim 5, said TIR prism assembly having a top surface angle of 27.5°.

* * * * *